Oct. 17, 1944.    D. E. MEEHAN    2,360,571
PROPELLER
Filed Nov. 30, 1942    2 Sheets-Sheet 1
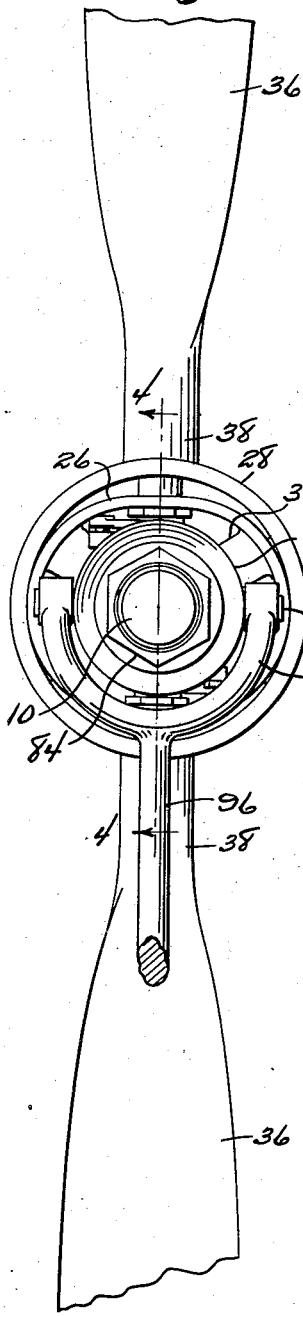
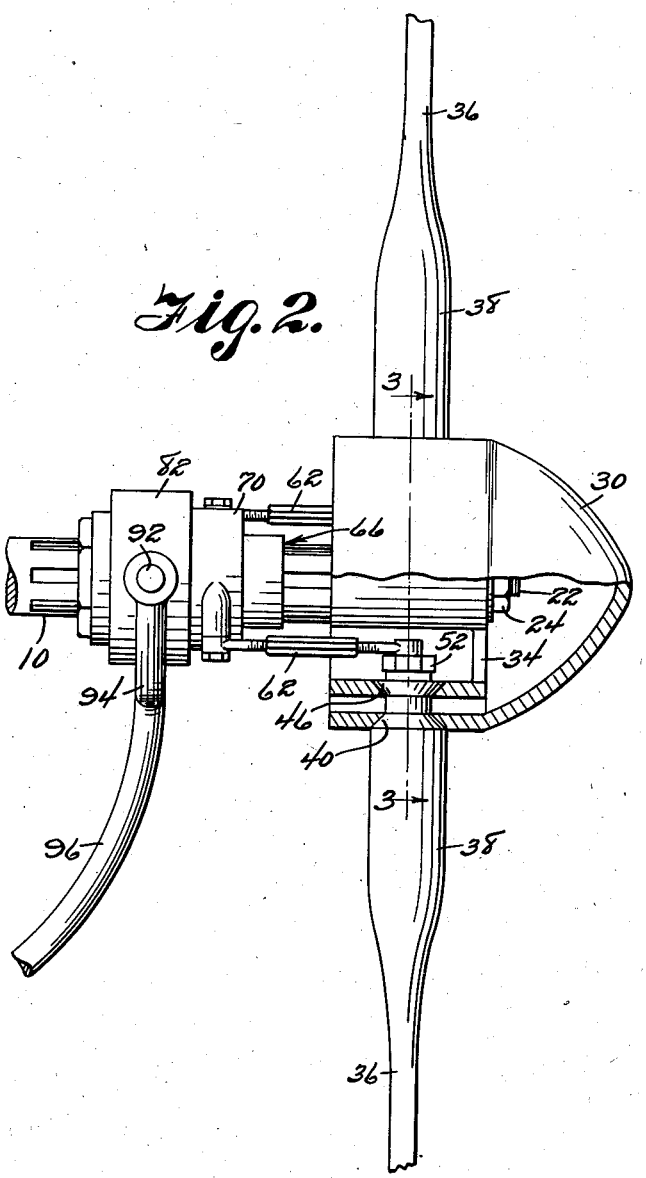
Donald E. Meehan INVENTOR.
BY
Victor J. Evans & Co.
ATTORNEYS Oct. 17, 1944.  D. E. MEEHAN  2,360,571
PROPELLER
Filed Nov. 30, 1942  2 Sheets-Sheet 2

Donald E. Meehan INVENTOR.

BY
Victor J. Evans & Co.

ATTORNEYS

Patented Oct. 17, 1944

2,360,571

UNITED STATES PATENT OFFICE 2,360,571

PROPELLER

Donald E. Meehan, Washington, D. C.

Application November 30, 1942, Serial No. 467,381

4 Claims. (Cl. 170—163)

My invention relates to propellers, and has among its objects and advantages the provision of an improved variable pitch propeller so constructed as to permit reversal of the screw of the propeller to the end that the vehicle to which it is attached may be propelled forwardly or rearwardly when the propeller is rotated in an unchanging direction.

In the accompanying drawings:

Figure 1 is a face view of the propeller hub structure and portions of the two blades associated therewith.

Figure 2 is a side view partly in section.

Figure 3:
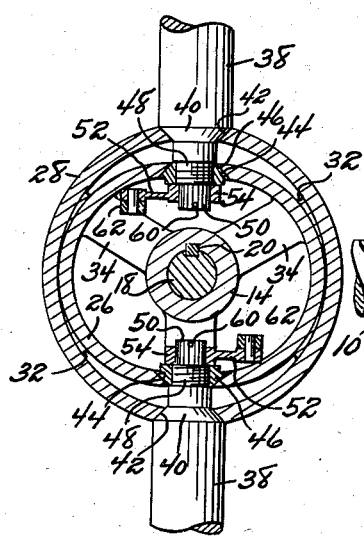
Figure 3 is a sectional view along the line 3—3 of Figure 2.

In the embodiment of the invention selected for illustration, I make use of a power driven shaft 10 having a nose or hub structure 12 attached to one end. The hub structure comprises a central body 14 having a tapered bore 16 for connection with the tapered end 18 of the shaft 10. A key 20 fixedly connects the end 18 with the body 14, and the end 18 is provided with a threaded part 22 for connection with a nut 24 to additionally secure the body to the shaft. An oval shaped ring 26 is arranged inside an annular member 28 having a nose or cap end 30. The member 26 is fixed to the member 28, as by welded connections 32. Arms 34 fixedly connect the body 14 with the member 26, and the body 14 and the two members 26 and 28 lie in a common plane transversely of the axis of the shaft 10.

The propeller blades 36 are provided with shanks 38 having tapered ends 40 rotatably guided in tapered openings 42 in the member 28. Tapered openings 44 are provided in the member 26 coaxially of the openings 42 for rotatably guiding tapered nuts 46 threadedly connected with the reduced diameter ends 48 of the shanks 38.

Figure 6:
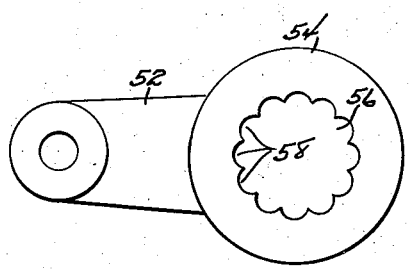
Figure 6 is a face view of a crank arm.

The ends 48 terminate in splined portions 50 upon which are mounted crank arms 52. Figure 6 illustrates one of the arms 52, the arm including an end 54 having an opening 56 provided with surface irregularities 58 conforming to the contour of the splined end 50, so that the arm is fixedly connected with the end to impart rotation to the propeller blade. In Figure 3, pins 60 extend through the ends 50 to hold the arms 52 on the ends.

Turnbuckles 62 are pivotally connected with the outer ends of the crank arms 52 and with pins 64 threaded into a sleeve 66 mounted on the shaft 10. The turnbuckles 62 parallel the shaft 10 and are spaced 180 degrees apart. The pins 64 are threaded into shoulders 68 formed on a flange 70 located intermediate the ends of the sleeve 66.

Figure 4:
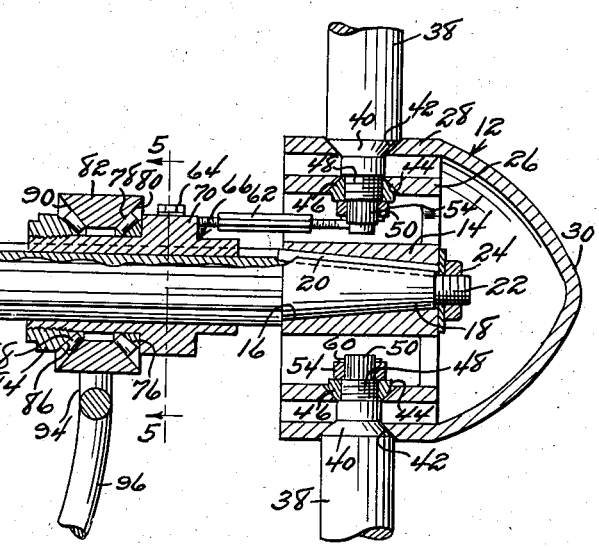
Figure 4 is a sectional view along the line 4—4 of Figure 1.
Figure 5:
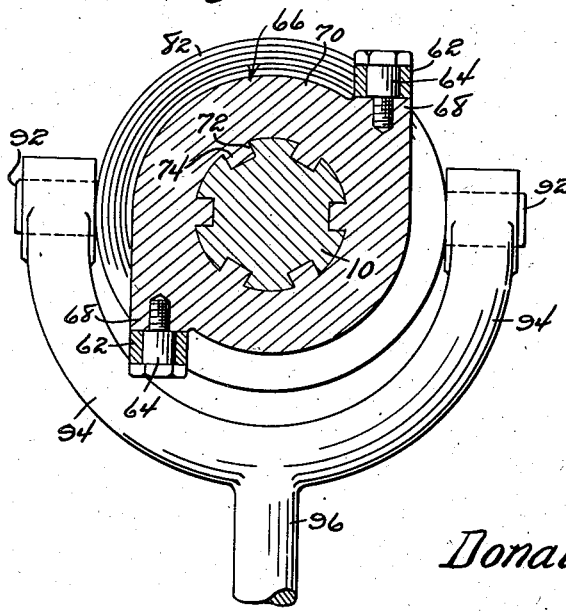
Figure 5 is a sectional view along the line 5—5 of Figure 4.

In Figures 4 and 5, the shaft 10 is provided with longitudinal grooves 72 for slidably guiding ribs 74 arranged longitudinally and radially inside the sleeve 66, so that the sleeve may be shifted longitudinally of the shaft 10 but is keyed for rotation therewith. Upon the sleeve 66 is mounted a bearing race 76 for coaction with tapered roller bearings 78 engaging a face or bearing race 80 on one end of a collar 82. A nut 84 is threadedly connected with the sleeve 66 and is provided with a bearing race or face 86 coacting with tapered roller bearings 88 engaging a second bearing race or face 90 at the other end of the collar 82. The race 76 lies against the flange 70, and the nut 84 permits precise adjustment of the bearing assembly.

Two pins 92 are attached to the collar 82, which pins are coaxial and serve as mounts for arms 94 attached to an actuating rod 96. The control rod 96 and the general features and arrangement of the propeller are disclosed in an application for patent filed by me on power driven ski sled of even date herewith. The propeller is employed to drive a vehicle in either direction through rotation of the propeller blades in sufficient amounts to reverse the screw of the propeller, so that the vehicle may be driven in either direction through the medium of a drive shaft rotating in one direction only.

The crank arms 52 are so arranged that the blades 36 are simultaneously rotated in opposite directions. Thus the pitch of the propeller as well as the direction of its screw action may be changed through manipulation of the sleeve 66 longitudinally of the drive shaft 10.

Without further elaboration, the foregoing will so fully explain my invention, that others may, by applying current knowledge, readily adapt the same for use under various conditions of service.

I claim:

1. In propeller mechanism, a shaft, a hub fixed on the shaft, an outer ring mounted concentrically about the hub, an inner ring fixed within said outer ring and connected with the hub, said inner ring being disposed so that opposed parts thereof are provided with openings and are spaced inwardly of diametrically opposed openings in the outer ring, the openings in the outer ring having an increasing taper radially outward thereof and the openings in the inner ring having a taper increasing inwardly thereof, a propeller blade having a reduced inner shank portion extended through the complementary openings in the respective rings, said blade extending radially of the shaft and having a tapered shoulder at the outer end of the shank conforming to and fitting the opening in the outer ring, a collar removably fixed on said shank and tapered in conformity with and fitting in the opening in the inner ring, and means on the blades and the shaft for turning said blades about their axes.

2. Propeller mechanism as claimed in claim 1 wherein said inner ring comprises a member of ovaloid contour having the ends of its major axis contiguous with and fixed within the outer ring and its minor axis spaced substantially inward of diametrically opposed points of the outer ring.

3. Propeller mechanism as claimed in claim 1 including a sleeve splined on the shaft, a pair of pivot elements carried on said sleeve, a radially disposed arm splined on the inner end of each blade shank, and a longitudinally adjustable member connecting the outer end of each arm with the respective pivot elements on the sleeve for turning the blades upon axial adjustment of said sleeve on the shaft.

4. Propeller mechanism as claimed in claim 1 including a sleeve splined on the shaft, a pair of pivot elements carried on said sleeve, a radially disposed arm splined on the inner end of each blade shank, a longitudinally adjustable member connecting the outer end of each arm with the respective pivot elements on the sleeve for turning the blades upon axial adjustment of said sleeve on the shaft, co-acting bearing race elements mounted circumferentially on the sleeve having beveled bearing faces, a collar having beveled end faces mounted about the sleeve in co-acting relation with the races, roller bearings mounted between the beveled faces of the collar and the races, and an actuating member pivotally connected with the collar for shifting the sleeve axially on the shaft.

DONALD E. MEEHAN.